United States Patent
Aoyama et al.

(10) Patent No.: US 7,316,126 B2
(45) Date of Patent: Jan. 8, 2008

(54) ABSORPTION REFRIGERATING MACHINE

(75) Inventors: Jun Aoyama, Tokyo (JP); Jun Murata, Tokyo (JP); Norio Arai, Tokyo (JP); Toshio Matsubara, Tokyo (JP)

(73) Assignee: Ebara Refrigeration Equipment & Systems Co., Ltd., Tokyo (JP)

( * ) Notice: Subject to any disclaimer, the term of this patent is extended or adjusted under 35 U.S.C. 154(b) by 51 days.

(21) Appl. No.: 10/556,724

(22) PCT Filed: May 14, 2004

(86) PCT No.: PCT/JP2004/006851

§ 371 (c)(1),
(2), (4) Date: Nov. 14, 2005

(87) PCT Pub. No.: WO2004/102085

PCT Pub. Date: Nov. 25, 2004

(65) Prior Publication Data

US 2006/0196222 A1    Sep. 7, 2006

(30) Foreign Application Priority Data

May 14, 2003    (JP)    ................ 2003-135359

(51) Int. Cl.
*F25B 15/00*    (2006.01)
(52) U.S. Cl. .......................... 62/476; 62/484
(58) Field of Classification Search ........ 62/476, 62/101, 484, 489
See application file for complete search history.

(56) References Cited

U.S. PATENT DOCUMENTS

| | | | |
|---|---|---|---|
| 5,345,786 A * | 9/1994 | Yoda et al. ............ | 62/476 |
| 6,477,852 B2 * | 11/2002 | Dodo et al. .......... | 62/238.3 |
| 6,769,266 B2 * | 8/2004 | Dodo et al. .......... | 62/238.3 |

FOREIGN PATENT DOCUMENTS

| | | |
|---|---|---|
| JP | 2777427 | 5/1998 |
| JP | 10-160276 | 6/1998 |
| JP | 2003-065624 | 3/2003 |
| JP | 2003-121021 | 4/2003 |

* cited by examiner

*Primary Examiner*—Melvin Jones
(74) *Attorney, Agent, or Firm*—Westerman, Hattori, Daniels & Adrian, LLP.

(57) ABSTRACT

The present invention provides a high-efficiency absorption refrigerating machine which can recover heat from a heat source and can efficiently recover heat from an internal cycle. The absorption refrigerating machine includes an evaporator, an absorber (A), a condenser (C), a high-temperature regenerator (GH), a low-temperature regenerator (GL), a low-temperature solution heat exchanger (LX), and solution paths and refrigerant paths by which these units are connected. The absorption refrigerating machine further comprises two branch solution paths branched from a solution supply path through which a dilute solution is introduced from the absorption (A) to the high-temperature regenerator (GH). On one of the branch solution paths, there is disposed a drain heat exchanger (DX) operable to perform heat exchange between the dilute solution in the branch solution path and an exhaust heat source which has heated the high-temperature regenerator (GH). On the other of the branch solution paths, there are disposed a first high-temperature solution heat exchanger (HX1) and a second high-temperature solution heat exchanger (HX2) operable to perform heat exchange between the dilute solution in the branch solution path and a concentrated solution heated and concentrated in the high-temperature regenerator (GH). The absorption refrigerating machine is configured such that the dilute solution flows through the first high-temperature solution heat exchanger (HX1) and the second high-temperature solution heat exchanger (HX2) in this order, and the concentrated solution discharged from the high-temperature regenerator flows through the second high-temperature solution heat exchanger (HX2) and the first high-temperature solution heat exchanger (HX1) in this order.

14 Claims, 12 Drawing Sheets

ABSORPTION REFRIGERATING MACHINE

TECHNICAL FIELD

The present invention relates to an absorption refrigerating machine, and more particularly to a high-efficiency absorption refrigerating machine using vapor as a heat source for recovering heat from the heat source and for efficiently recovering heat from an internal cycle.

BACKGROUND ART

Providing a drain heat exchanger is a known technique for improving the efficiency of an absorption refrigerating machine using vapor as a heat source. The drain heat exchanger is disposed so as to perform heat exchange between vapor drain, which has heated and concentrated a solution in a high-temperature regenerator, and an absorption solution. Japanese laid-open patent publication No. 51-11332 discloses an example of this kind of drain heat exchanger provided between a low-temperature solution heat exchanger and a high-temperature solution heat exchanger. In this example, a dilute solution is discharged from the drain heat exchanger with an increased temperature, and therefore sufficient heat recovery cannot be performed in the high-temperature solution heat exchanger. Japanese laid-open patent publication No. 51-13259 discloses a technique to solve the above drawback. This technique introduces a concentrated solution, which has been heated in a low-temperature solution heat exchanger, into a drain heat exchanger and a high-temperature solution heat exchanger in parallel and then into a high-temperature regenerator.

However, the above conventional technique may meet another problem when increasing the temperature efficiency of the high-temperature solution heat exchanger and the drain heat exchanger in order to perform sufficient heat recovery and to further improve the efficiency of the absorption refrigerating machine. Specifically, the solution may flash in the high-temperature solution heat exchanger and the drain heat exchanger, causing corrosion. Further, flashing of the solution would prevent flow of the solution through the high-temperature solution heat exchanger and the drain heat exchanger, and therefore result in a lowered heat-transfer capability.

This problem may remarkably occur in a case where a path of the dilute solution to be supplied to the high-temperature regenerator is divided into two branches. This is because amounts of the dilute solutions flowing respectively through the high-temperature solution heat exchanger and the drain heat exchanger become small, and therefore the temperature of a dilute-solution side increases greatly, exceeding a saturation temperature that is determined by the concentration and the pressure of the dilute solution.

In order to solve this problem, it has been proposed to provide a resistance such as an orifice so as to provide a back pressure at outlet sides of the high-temperature solution heat exchanger and the drain heat exchanger. However, this approach may cause another problem because it would require an increased pump power by an amount corresponding to the resistance of the orifice.

Further, in an absorption refrigerating machine having an evaporator and an absorber designed to operate in a multistage manner, the concentration of the solution at an outlet of the absorber is considerably lowered, and hence a temperature at which the solution flashes is lowered according to the decrease in concentration.

Recently, in order to meet customer requirements, there has been a tendency in a production lineup of the absorption refrigerating machine to provide two types, a standard type and a high-efficiency type.

The standard type is provided as a basic model designed to prevent flashing due to an increase in temperature of the solution by restricting the temperature efficiency of the high-temperature solution heat exchanger and the drain heat exchanger. Additional functions for increasing efficiency can be added to the standard type, so that high efficiency can be easily achieved and productivity can be further increased.

DISCLOSURE OF INVENTION

The present invention has been made in view of the above drawbacks. It is, therefore, an object of the present invention to provide a high-efficiency absorption refrigerating machine which can efficiently recover heat from an external heat source and can also efficiently recover internal heat.

According to a first aspect of the present invention, there is provided an absorption refrigerating machine comprising an evaporator, an absorber, a condenser, a high-temperature regenerator, a low-temperature regenerator, a low-temperature solution heat exchanger, and solution paths and refrigerant paths by which these units are connected. The absorption refrigerating machine further comprises two branch solution paths branched from a solution supply path through which a dilute solution is introduced from the absorber to the high-temperature regenerator. On one of the branch solution paths, there is disposed a drain heat exchanger operable to perform heat exchange between the dilute solution in the branch solution path and an exhaust heat source which has heated the high-temperature regenerator. On the other of the branch solution paths, there are disposed a first high-temperature solution heat exchanger and a second high-temperature solution heat exchanger operable to perform heat exchange between the dilute solution in the branch solution path and a concentrated solution heated and concentrated in the high-temperature regenerator. The absorption refrigerating machine is configured such that the dilute solution flows through the first high-temperature solution heat exchanger and the second high-temperature solution heat exchanger in this order, and the concentrated solution discharged from the high-temperature regenerator flows through the second high-temperature solution heat exchanger and the first high-temperature solution heat exchanger in this order.

According to a second aspect of the present invention, there is provided an absorption refrigerating machine comprising an evaporator, an absorber, a condenser, a high-temperature regenerator, a low-temperature regenerator, a low-temperature solution heat exchanger, and solution paths and refrigerant paths by which these units are connected. The absorption refrigerating machine further comprises two branch solution paths branched from a solution supply path through which a dilute solution is introduced from the absorber to the high-temperature regenerator. On one of the branch solution paths, there is disposed a high-temperature solution heat exchanger operable to perform heat exchange between the dilute solution in the branch solution path and a concentrated solution heated and concentrated in the high-temperature regenerator. On the other of the branch solution paths, there are disposed a first drain heat exchanger and a second drain heat exchanger operable to perform heat exchange between the dilute solution in the branch solution path and an exhaust heat source which has heated the high-temperature regenerator. The absorption refrigerating machine is configured such that the dilute solution flows through the first drain heat exchanger and the second drain heat exchanger in this order, and the exhaust heat source flows through the second drain heat exchanger and the first drain heat exchanger in this order.

According to a third aspect of the present invention, there is provided an absorption refrigerating machine comprising an evaporator, an absorber, a condenser, a high-temperature regenerator, a low-temperature regenerator, a low-temperature solution heat exchanger, and solution paths and refrigerant paths by which these units are connected. The absorption refrigerating machine further comprises two branch solution paths branched from a solution supply path through which a dilute solution is introduced from the absorber to the high-temperature regenerator. On one of the branch solution paths, there are disposed a first drain heat exchanger and a second drain heat exchanger operable to perform heat exchange between the dilute solution in the branch solution path and an exhaust heat source which has heated the high-temperature regenerator. The absorption refrigerating machine is configured such that the dilute solution flows through the first drain heat exchanger and the second drain heat exchanger in this order, and the exhaust heat source flows through the second drain heat exchanger and the first drain heat exchanger in this order. On the other of the branch solution paths, there are disposed a first high-temperature solution heat exchanger and a second high-temperature solution heat exchanger operable to perform heat exchange between the dilute solution in the branch solution path and a concentrated solution heated and concentrated in the high-temperature regenerator. The absorption refrigerating machine is configured such that the dilute solution flows through the first high-temperature solution heat exchanger and the second high-temperature solution heat exchanger in this order, and the concentrated solution discharged from the high-temperature regenerator flows through the second high-temperature solution heat exchanger and the first high-temperature solution heat exchanger in this order.

In the absorption refrigerating machine, it is preferable that the second high-temperature solution heat exchanger and/or the second drain heat exchanger has a heat-transfer member, and the dilute solution to be supplied to the high-temperature regenerator flows along an outer portion of the heat-transfer member. These heat exchangers may be constructed integrally with the high-temperature regenerator.

According to a fourth aspect of the present invention, there is provided an absorption refrigerating machine comprising an evaporator, an absorber, a condenser, a high-temperature regenerator, a low-temperature regenerator, a low-temperature solution heat exchanger, and solution paths and refrigerant paths by which these units are connected. The absorption refrigerating machine further comprises two branch solution paths branched from a solution supply path through which a dilute solution is introduced from the absorber to the high-temperature regenerator. A recovery heat exchanger is disposed on a solution supply path through which the dilute solution is introduced from the absorber to the low-temperature regenerator. The recovery heat exchanger is operable to perform heat exchange between the dilute solution in the solution supply path and a concentrated solution heated and concentrated in the high-temperature regenerator. On one of the branch solution paths of the solution supply path to the high-temperature regenerator, there is disposed a drain heat exchanger operable to perform heat exchange between the dilute solution in the branch solution path and an exhaust heat source which has heated the high-temperature regenerator. On the other of the branch solution paths, there is disposed a high-temperature solution heat exchanger operable to perform heat exchange between the dilute solution in the branch solution path and the concentrated solution discharged from a heating side of the recovery heat exchanger.

The recovery heat exchanger may be disposed adjacent to a group of heat-transfer pipes of the low-temperature regenerator, and may be disposed in a casing of the low-temperature regenerator.

In the absorption refrigerating machine, a solution path, through which the dilute solution is discharged from the absorber, may extend through a heat-receiving side of the low-temperature solution heat exchanger to a branch point of the branch solution paths. One of the branch solution paths may be branched from the solution path at a midpoint of a heat-receiving side of the low-temperature solution heat exchanger, and may be connected to the high-temperature regenerator via the drain heat exchanger. Each of the evaporator and the absorber may have a multistage structure which operates at different pressure stages.

BEST MODE FOR CARRYING OUT THE INVENTION

According to the present invention, a second high-temperature solution heat exchanger and/or a second drain heat exchanger is provided in addition to a first high-temperature solution heat exchanger and/or a first drain heat exchanger, so that heat can be efficiently recovered from an internal cycle. Further, a solution is allowed to flash in the second high-temperature solution heat exchanger and/or the second drain heat exchanger, so that flash vapor can be utilized as a double-effect cycle.

Furthermore, part of the heat recovered in the high-temperature solution heat exchanger is given to a dilute solution to be supplied to a low-temperature regenerator, so that internal heat can be efficiently recovered and the solution can be prevented from flashing in the high-temperature solution heat exchanger.

Embodiments of the absorption refrigerating machine according to the present invention will be described below with reference to FIGS. 1 through 12.

Figure 1:
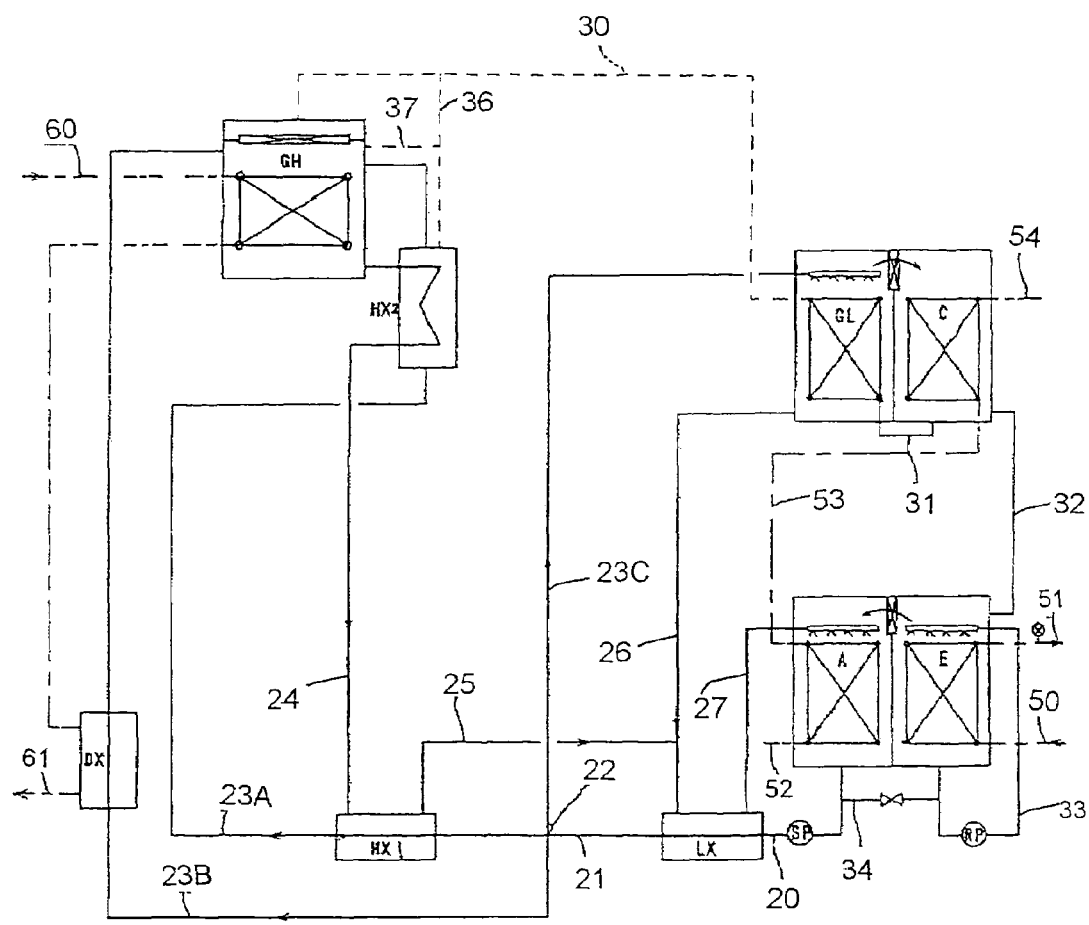
FIG. 1 is a flow diagram showing an absorption refrigerating machine according to a first embodiment of the present invention.
Figure 2:
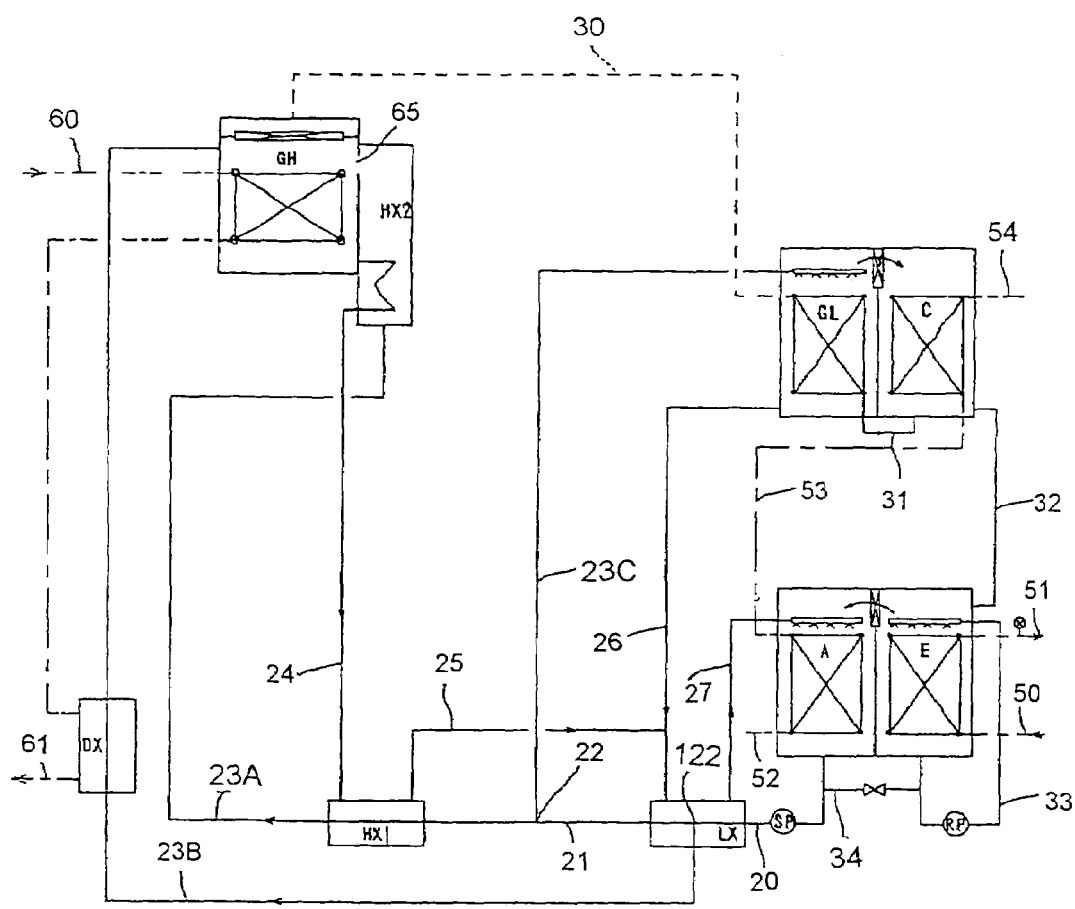
FIG. 2 is a flow diagram showing an absorption refrigerating machine according to a second embodiment of the present invention.
Figure 3:
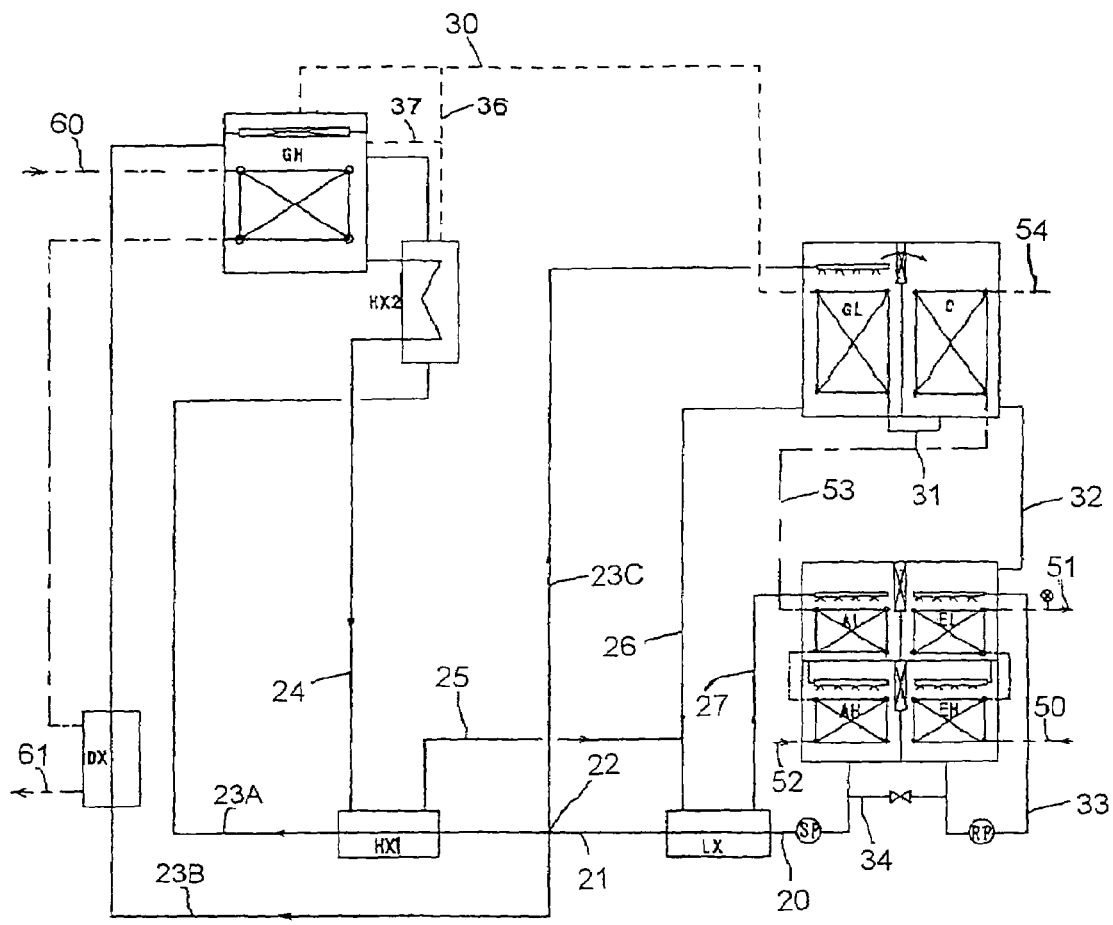
FIG. 3 is a flow diagram showing an absorption refrigerating machine according to a third embodiment of the present invention.
Figure 4:
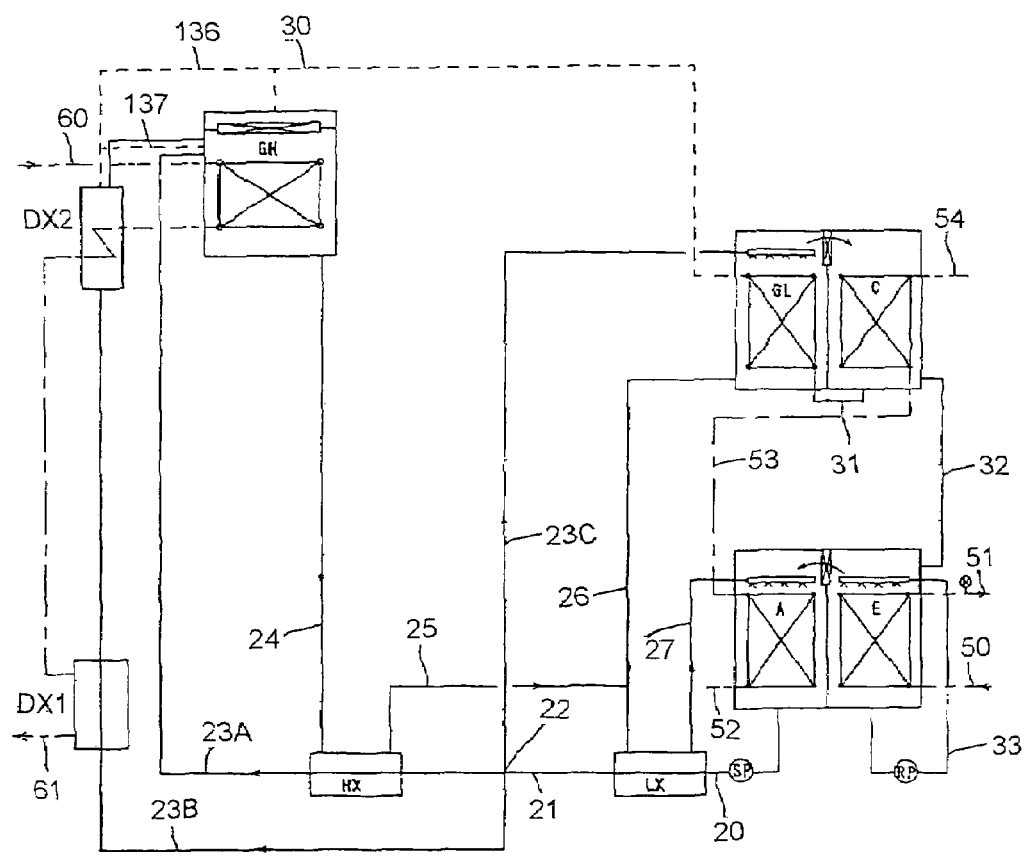
FIG. 4 is a flow diagram showing an absorption refrigerating machine according to a fourth embodiment of the present invention.
Figure 5:
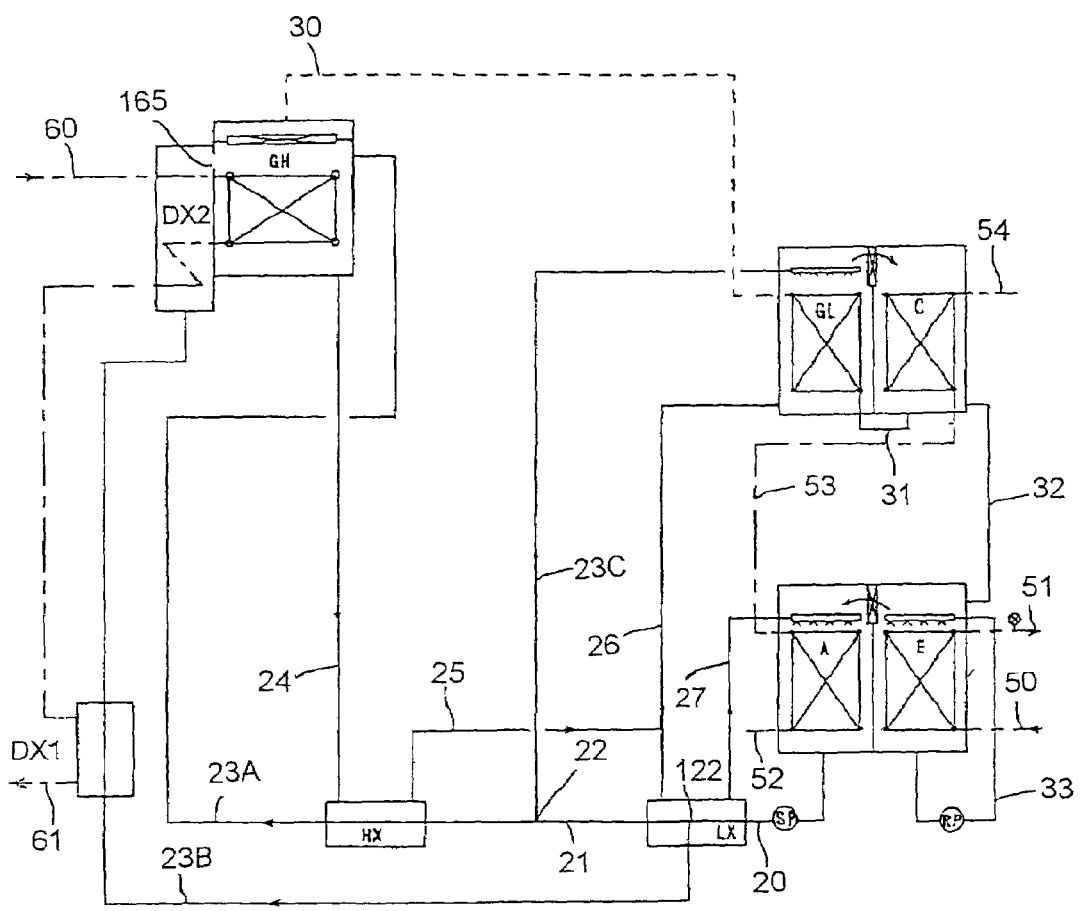
FIG. 5 is a flow diagram showing an absorption refrigerating machine according to a fifth embodiment of the present invention.
Figure 6:
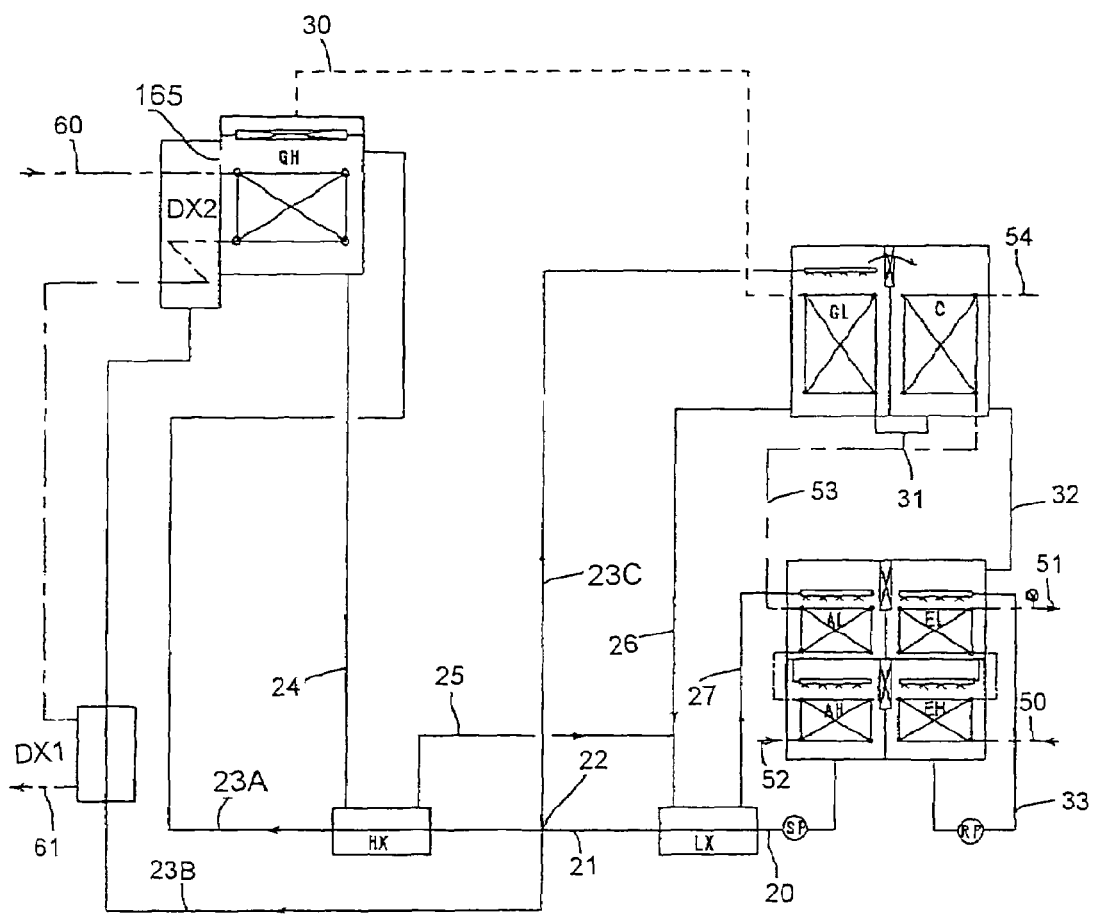
FIG. 6 is a flow diagram showing an absorption refrigerating machine according to a sixth embodiment of the present invention.
Figure 7:
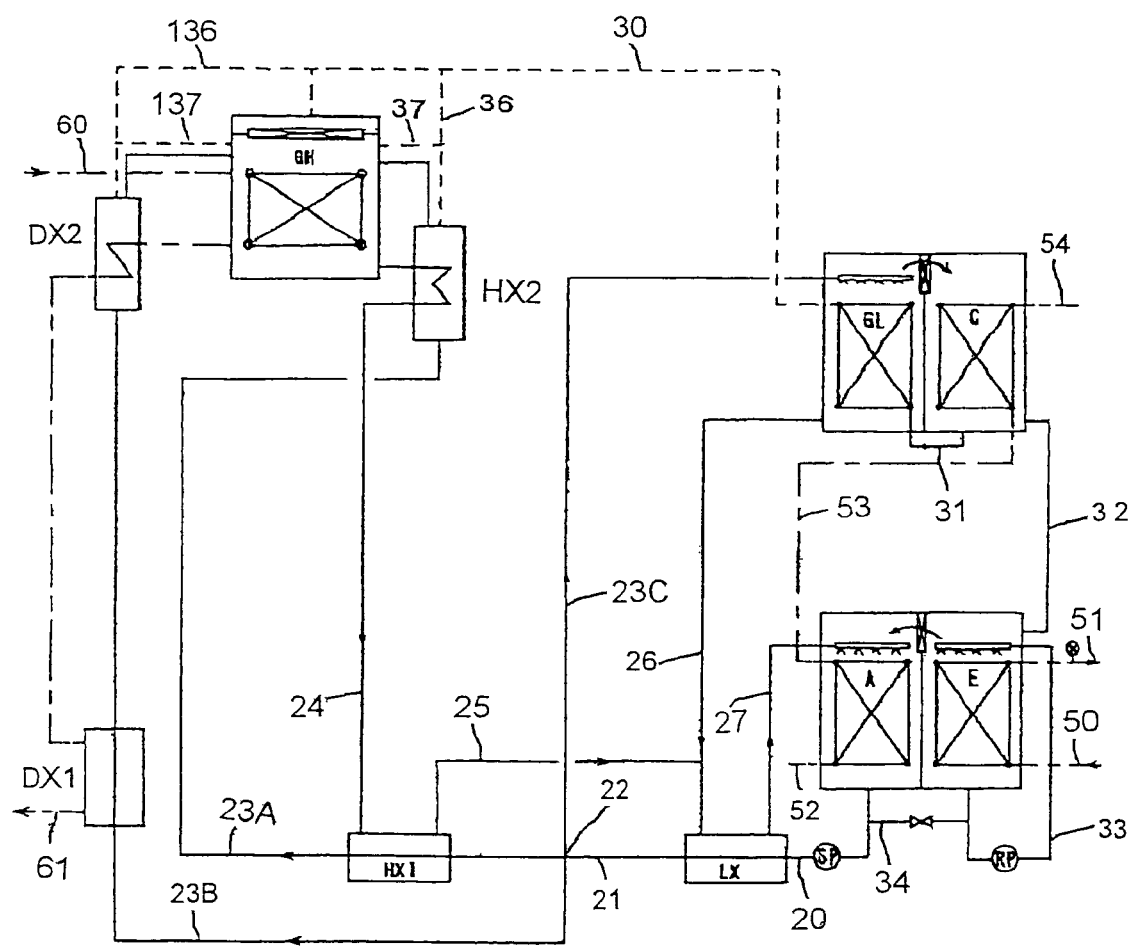
FIG. 7 is a flow diagram showing an absorption refrigerating machine according to a seventh embodiment of the present invention.
Figure 8:
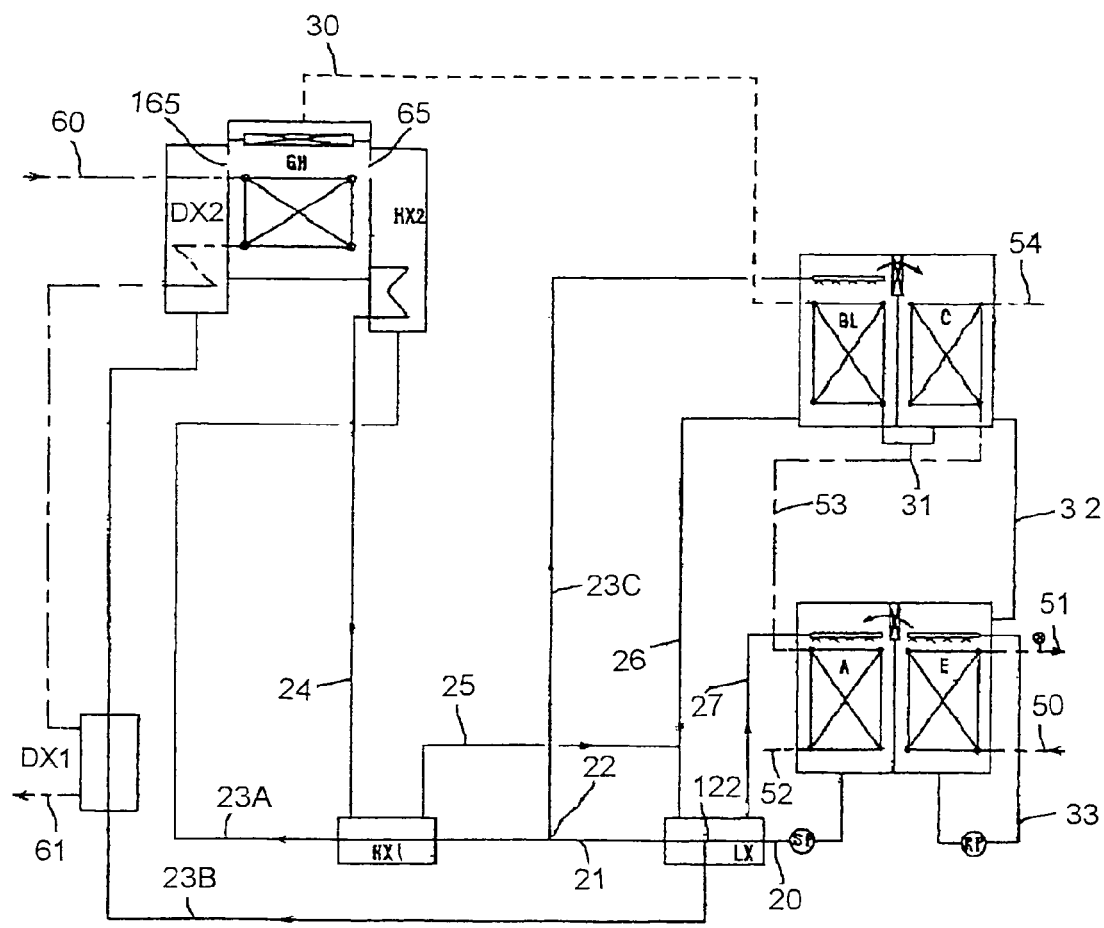
FIG. 8 is a flow diagram showing an absorption refrigerating machine according to an eighth embodiment of the present invention.
Figure 9:
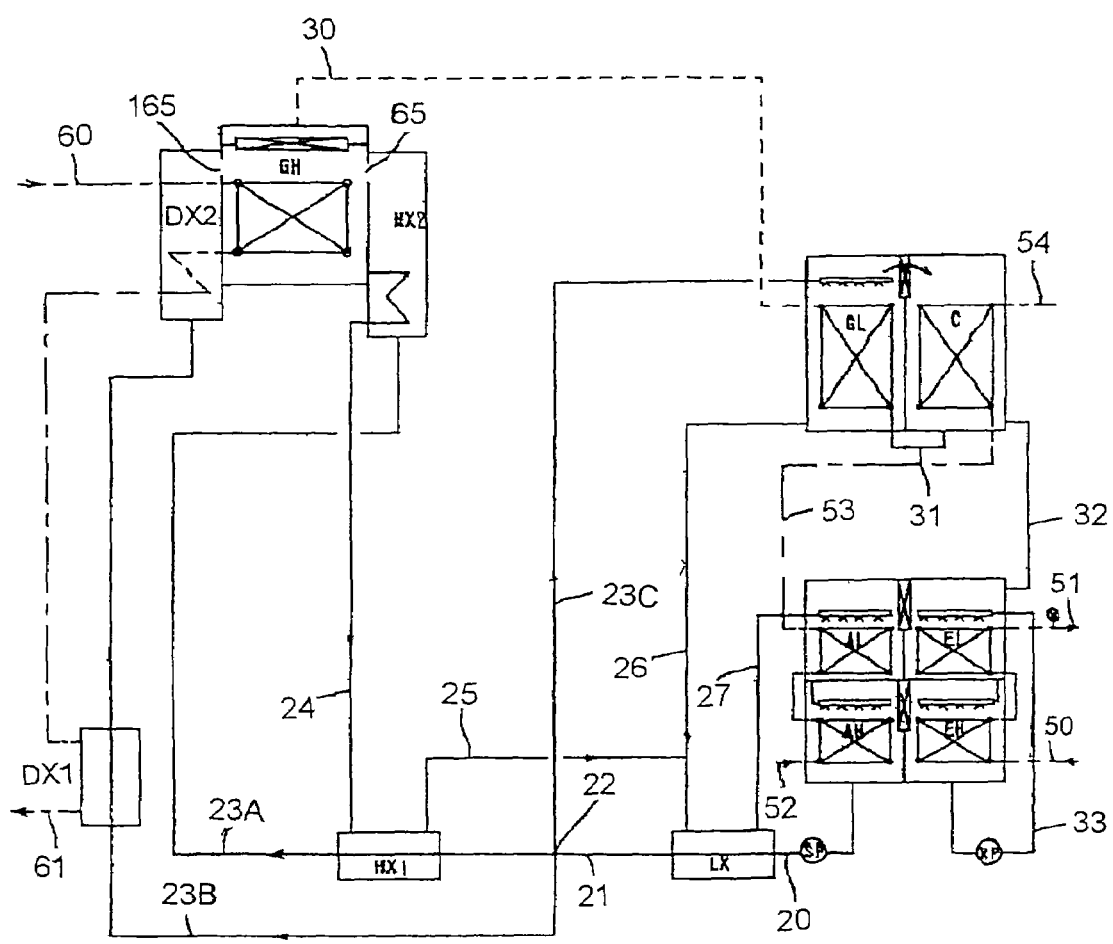
FIG. 9 is a flow diagram showing an absorption refrigerating machine according to a ninth embodiment of the present invention.
Figure 10:
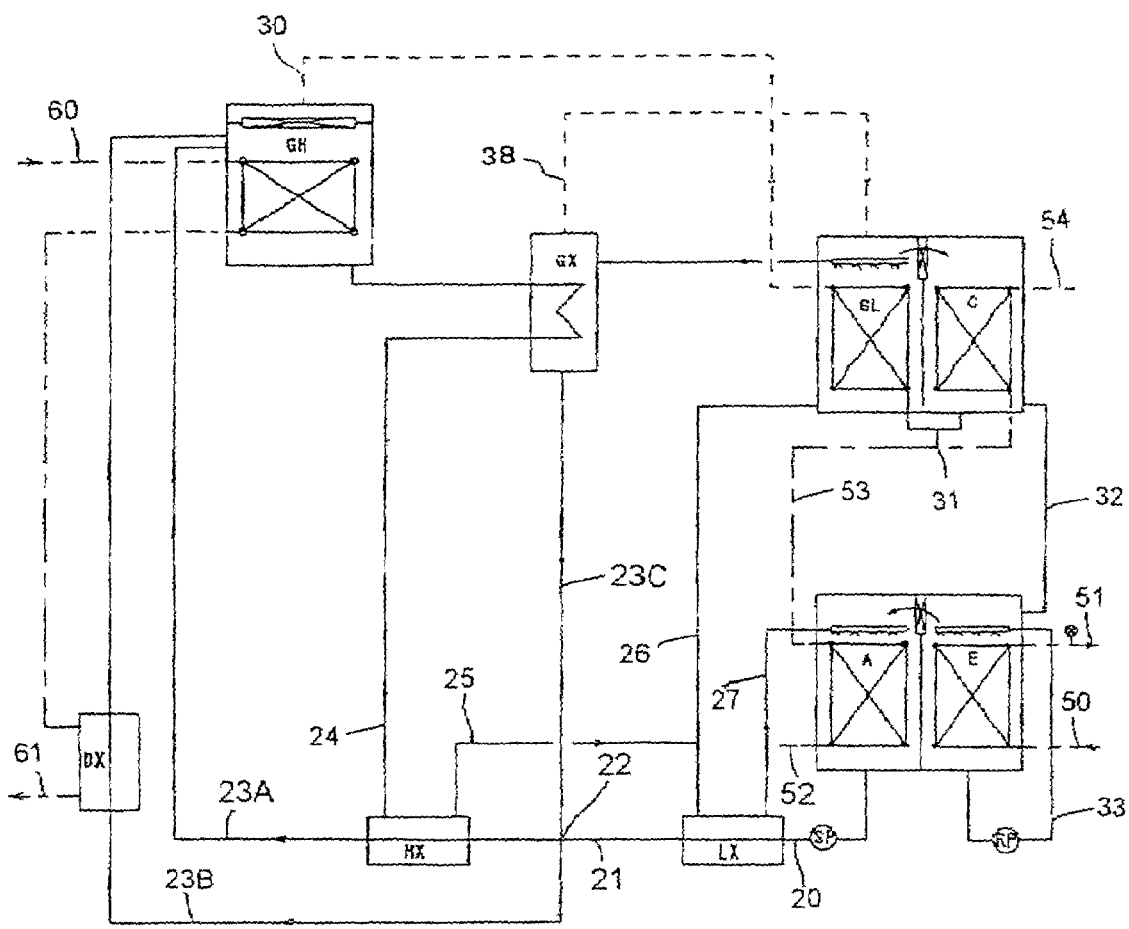
FIG. 10 is a flow diagram showing an absorption refrigerating machine according to a tenth embodiment of the present invention.
Figure 11:
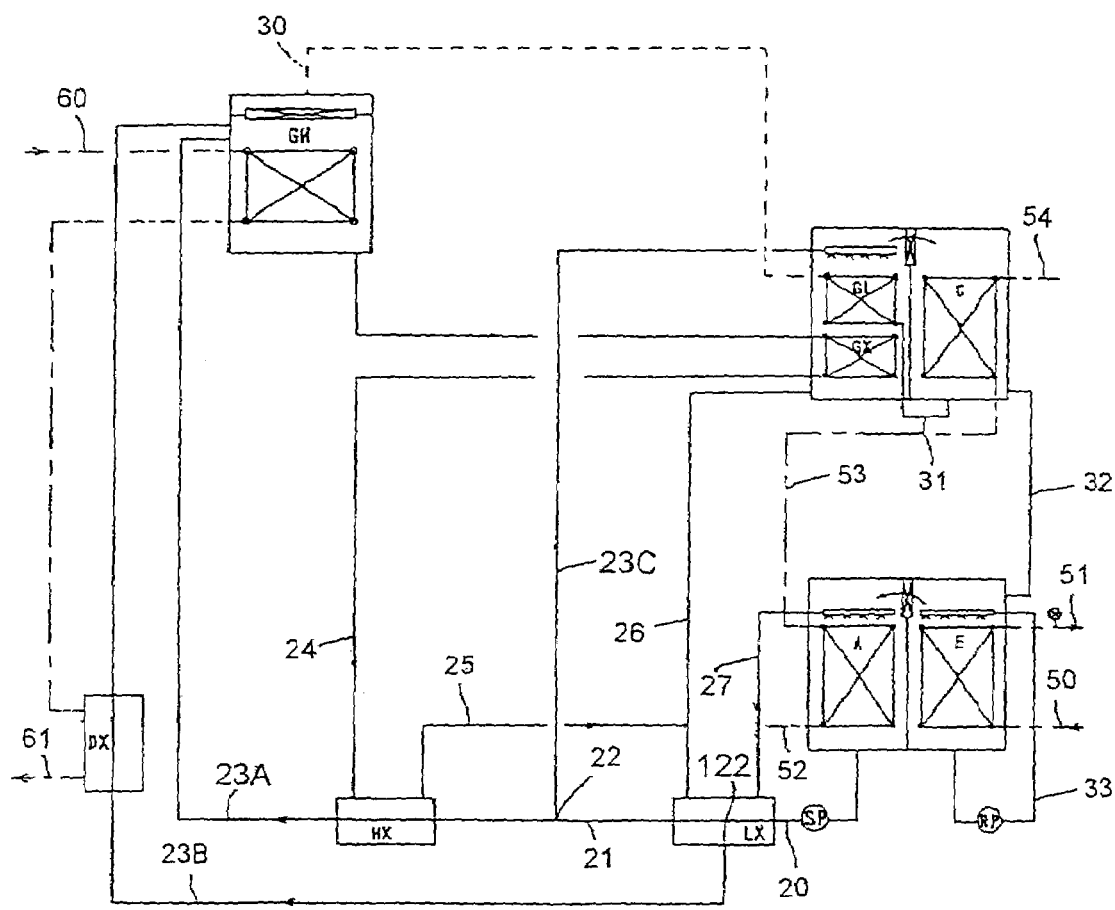
FIG. 11 is a flow diagram showing an absorption refrigerating machine according to an eleventh embodiment of the present invention.
Figure 12:
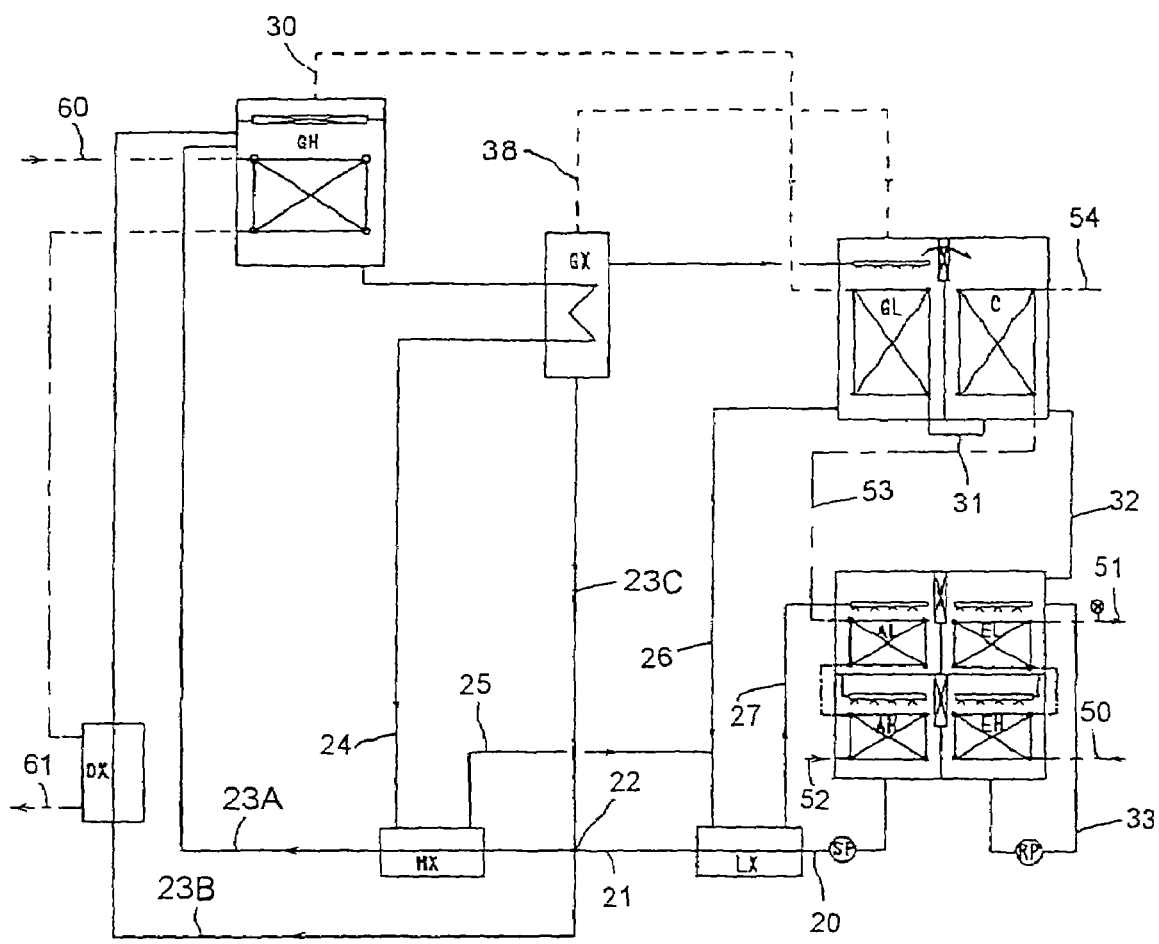
FIG. 12 is a flow diagram showing an absorption refrigerating machine according to a twelfth embodiment of the present invention.

FIGS. 1 through 3 show embodiments of the absorption refrigerating machine having the first and second high-temperature solution heat exchangers according to the present invention, and FIGS. 4 through 6 show embodiments of the absorption refrigerating machine having the first and second drain heat exchangers according to the present invention. FIGS. 7 through 9 show embodiments of the absorption refrigerating machine having the first and second high-temperature solution heat exchangers and the first and second drain heat exchangers according to the present invention, and FIGS. 10 through 12 show embodiments of the absorption refrigerating machine having a recovery heat exchanger which recovers heat using a low-temperature regenerator according to the present invention.

In FIGS. 1 through 12, GH represents a high-temperature regenerator, GL represents a low-temperature regenerator, DX represents a drain heat exchanger, DX1 represents a first drain heat exchanger, DX2 represents a second drain heat exchanger, LX represents a low-temperature solution heat exchanger, HX represents a high-temperature solution heat exchanger, HX1 represents a first high-temperature solution heat exchanger, HX2 represents a second high-temperature solution heat exchanger, GX represents a recovery heat exchanger, A represents an absorber, E represents an evaporator, AH represents a high-pressure absorber, AL represents a low-pressure absorber, EH represents a high-pressure evaporator, EL represents a low-pressure evaporator, RP represents a refrigerant pump, SP represents a solution pump, reference numerals 20 to 22, 23A, 23B, 23C, 24 to 27, and 122 represent solution paths, reference numerals 30 to 34, 36, 37, 38, 136, and 137 represent refrigerant paths, reference numerals 50 and 51 represent cold water paths, reference numerals 52 to 54 represent cooling water paths, and reference numerals 60 and 61 represent heat source paths.

First, the embodiment of the absorption refrigerating machine having the first and second high-temperature solution heat exchangers will be described.

FIG. 1 is a flow diagram showing the absorption refrigerating machine according to a first embodiment of the present invention. In FIG. 1, a dilute solution absorbs refrigerant vapor discharged from the evaporator E, and is delivered by the solution pump SP from the absorber A to the low-temperature solution heat exchanger LX through the solution path 20. The dilute solution passes through a heat-receiving side of the low-temperature solution heat exchanger LX, whereby the temperature of the dilute solution is increased. Then, the dilute solution flows through the solution path 21, and is divided at a branch point 22 on the solution path 21 into three currents flowing respectively into the first branch solution path 23A extending toward the high-temperature regenerator GH, the second branch solution path 23B extending toward the high-temperature regenerator GH, and the third branch solution path 23C extending toward the low-temperature regenerator GL.

The first high-temperature solution heat exchanger HX1 and the second high-temperature solution heat exchanger HX2 are provided on the first branch solution path 23A extending toward the high-temperature regenerator GH. The dilute solution to be supplied to the high-temperature regenerator GH through the first branch solution path 23A flows through the first high-temperature solution heat exchanger HX1 and the second high-temperature solution heat exchanger HX2 in this order, so that the dilute solution is successively heated. After being heated in this manner, the dilute solution is introduced into the high-temperature regenerator GH.

The drain heat exchanger DX is provided on the second branch solution path 23B extending toward the high-temperature regenerator GH. The drain heat exchanger DX performs heat exchange between a heat source fluid, which has heated and concentrated the absorption solution in the high-temperature regenerator GH and the dilute solution, which is to be supplied to the high-temperature regenerator GH, so that heat is recovered from the external heat source.

In the high-temperature regenerator GH, the dilute solution is heated and concentrated by the external heat source that is introduced through the heat source path 60 to thereby become a concentrated solution. The concentrated solution flows through the solution path 24 into the second high-temperature solution heat exchanger HX2 and the first high-temperature solution heat exchanger HX1 in this order to heat the dilute solution flowing at heat-receiving sides of the second high-temperature solution heat exchanger HX2 and the first high-temperature solution heat exchanger HX1. In this manner, heat is recovered from the internal cycle.

Generally, in the first high-temperature solution heat exchanger HX1, the solution is not heated to a level so as to flash. However, in the second high-temperature solution heat exchanger HX2, the solution may be heated to a level so as to flash. In the case where the solution flashes in the second high-temperature solution heat exchanger HX2, it is preferable to provide a pipe 36 and/or a pipe 37 through which flash vapor is discharged. Providing a pipe such as the pipe 37 is effective in removing the absorption solution accompanying the flash vapor, because an eliminator in the high-temperature regenerator GH can be utilized. Further, in order to sufficiently separate the flash vapor and the solution, it is preferable to introduce the concentrated solution into a heat-transfer member (of a tube type or plate-like type) which constitutes the second high-temperature solution heat exchanger HX2, and to introduce the dilute solution to an outer portion of the heat-transfer member. Vapor, which has flashed in the second high-temperature solution heat exchanger HX2, joins the vapor produced in the high-temperature regenerator GH, and is used in heating and concentrating the absorption solution in the low-temperature regenerator GL. In this manner, the flash vapor produced in the second high-temperature solution heat exchanger HX2 functions with a double effect, and can thus greatly contribute to the improvement of efficiency.

The concentrated solution which was heated and concentrated in the high-temperature regenerator GH passes through the second high-temperature solution heat exchanger HX2, the first high-temperature solution heat exchanger HX1, and the solution path 25, and then flows through the solution path 26 to join the concentrated solution returned from the low-temperature regenerator GL. After joining, the concentrated solution passes through a heating side of the low-temperature solution heat exchanger LX, and is returned to the absorber A through the solution path 27.

The refrigerant vapor regenerated in the high-temperature regenerator GH and the flash vapor produced in the second high-temperature solution heat exchanger HX2 are introduced into the heating side of the low-temperature regenerator GL through the refrigerant path 30 to heat and concentrate the dilute solution flowing downward from a sprayer, and then introduced into the condenser C through the refrigerant path 31.

The refrigerant vapor, which was regenerated in the low-temperature regenerator GL, is introduced into the condenser C via the eliminator. This refrigerant vapor is condensed by the cooling water flowing through heat-transfer pipes of the condenser C to thereby become a refrigerant liquid. This refrigerant liquid joins the refrigerant condensed by the low-temperature regenerator GL, and is returned to the evaporator E through the refrigerant path 32.

Although the absorption refrigerating machine shown in FIG. 1 utilizes a cycle using a so-called branch flow, the present invention is not limited to this cycle.

FIG. 2 is a flow diagram showing the absorption refrigerating machine according to a second embodiment of the present invention. In this embodiment, the second high-temperature solution heat exchanger HX2 is constructed integrally with the high-temperature regenerator GH. The solution, which was heated and concentrated in the second high-temperature solution heat exchanger HX2, and the flash vapor flow into the high-temperature regenerator GH through an opening 65 formed in a side surface of the high-temperature regenerator GH. The flash vapor flows through the eliminator into the heating side of the low-temperature regenerator GL. The dilute solution, which has flowed into the high-temperature regenerator GH, is further heated and concentrated by the external heat source, whereby the refrigerant vapor is regenerated. Thereafter, the solution flows out of the high-temperature regenerator GH.

Providing the second high-temperature solution heat exchanger HX2 integrally with the high-temperature regenerator GH can eliminate the need to provide a pipe for the flash vapor and can thus reduce radiation loss.

As shown in FIG. 2, the solution is divided at a branch point 122 positioned at a midpoint of a path of the heat-receiving side of the low-temperature solution heat exchanger LX, so that part of the dilute solution is led to the high-temperature regenerator GH via the drain heat exchanger DX.

The low-temperature solution heat exchanger LX may be divided into two units so that the dilute solution is divided at a position between these two units. This structure can lower the temperature of the dilute solution to be supplied to the drain heat exchanger DX to thereby facilitate heat recovery in the drain heat exchanger DX, and can also prevent insufficient cooling of the concentrated solution due to a lowered flow rate of the dilute solution in the low-temperature solution heat exchanger LX, i.e., can suppress a load increase in the absorber A.

FIG. 3 is a flow diagram showing the absorption refrigerating machine according to a third embodiment of the present invention. In this embodiment, the absorber and the evaporator have multistage structures. In FIG. 3, the absorber has a two-stage structure comprising a high-pressure absorber AH and a low-pressure absorber AL, and the evaporator also has a two-stage structure comprising a high-pressure evaporator EH and a low-pressure evaporator EL. It should be noted that the absorber and the evaporator are not limited to the two-stage structure.

The cold water with a relatively high temperature, which has been returned from an air conditioning operation, flows into the high-pressure evaporator EH, and is then cooled. Thereafter, the cold water is further cooled in the low-pressure evaporator EL, and is supplied to an air conditioner. In this structure, the high-pressure evaporator EH and the low-pressure evaporator EL operate at an evaporation temperature, e.g., 8° C. or 5° C. The high-pressure absorber AH and the low-pressure absorber AL, which operate together with these evaporators, can greatly lower the concentration of the dilute solution discharged from the absorber. As a result, an amount of the circulating solution can be reduced, and the concentration difference between the dilute solution and the concentrated solution can be set to be large. Accordingly, the efficiency of the absorption refrigerating machine can be further improved. In this method, the temperature difference of the cold water can be set to, for example, about 8° C. which is higher than the normal temperature difference, i.e., 5° C., so that the concentration of the dilute solution discharged from the absorber can be further lowered.

Although FIG. 3 shows the flow direction such that the cooling water flows through the high-pressure absorber AH, the low-pressure absorber AL, and the condenser C in this order, the present invention is not limited to this direction. For example, the cooling water can flow through the high-pressure absorber AH and the low-pressure absorber AL in parallel, and the cooling water can flow from the condenser C to the absorber. In this manner, the flow direction of the cooling water can be selected as desired.

Next, embodiments of the absorption refrigerating machine having the first and second drain heat exchangers according to the present invention will be described.

FIG. 4 is a flow diagram showing the absorption refrigerating machine according to a fourth embodiment of the present invention. In FIG. 4, the dilute solution, which has absorbed the refrigerant vapor discharged from the evaporator E, is delivered by the solution pump SP to flow through the solution path 20 from the absorber A to the heat-receiving side of the low-temperature solution heat exchanger LX, where the dilute solution is heated. The dilute solution flows through the solution path 21, and is then divided at the branch point 22 on the solution path 21 into three currents flowing respectively into the first branch solution path 23A extending toward the high-temperature regenerator GH, the second branch solution path 23B extending toward the high-temperature regenerator GH, and the third branch solution path 23C extending toward the low-temperature regenerator GL.

The high-temperature solution heat exchanger HX is provided on the first branch solution path 23A extending toward the high-temperature regenerator GH. The high-temperature solution heat exchanger HX performs heat exchange between the concentrated solution, which was heated in the high-temperature regenerator GH, and the dilute solution, which is to be supplied to the high-temperature regenerator GH so that internal heat is recovered.

The first drain heat exchanger DX1 and the second drain heat exchanger DX2 are provided on the second branch solution path 23B extending toward the high-temperature regenerator GH. The dilute solution to be supplied to the high-temperature regenerator GH through second branch solution path 23B flows through the first drain heat exchanger DX1 and the second drain heat exchanger DX2 in this order, so that the dilute solution is successively heated. After being heated in this manner, the dilute solution is introduced into the high-temperature regenerator GH.

The external heat source, which is introduced through the heat source path 60, heats and concentrates the dilute solution in the high-temperature regenerator GH, and is then introduced into the second drain heat exchanger DX2 and the first drain heat exchanger DX1 in this order. The external heat source heats the dilute solution flowing through the heat-receiving sides of the second drain heat exchanger DX2 and the first drain heat exchanger DX1, and is then discharged through the heat source path 61.

Generally, in the first drain solution heat exchanger DX1, the solution is not heated to a level so as to flash. However, in the second drain heat exchanger DX2, the solution may be heated to a level so as to flash. In the case where the solution flashes in the second drain heat exchanger DX2, it is preferable to provide a pipe 136 and/or a pipe 137 through which the flash vapor is discharged. Providing a pipe such as the pipe 137 is effective in removing the absorption solution accompanying the flash vapor, because the eliminator in the high-temperature regenerator GH can be utilized. Further, in order to sufficiently separate the flash vapor and the solution, it is preferable to introduce the concentrated solution into the heat-transfer member (of a tube type or plate-like type) which constitutes the second drain heat exchanger DX2, and to introduce the dilute solution to the outer portion of the heat-transfer member. Vapor, which has flashed in the second drain heat exchanger DX2, joins the vapor produced in the high-temperature regenerator GH, and is used in heating and concentrating the absorption solution in the low-temperature regenerator GL. In this manner, the flash vapor produced in the second drain heat exchanger DX2 functions with a double effect, and can thus greatly contribute to the improvement of efficiency.

The concentrated solution which was heated and concentrated in the high-temperature regenerator GH passes through the heating side of the high-temperature solution heat exchanger HX, and then flows through the solution path 26 to join the concentrated solution returned from the low-temperature regenerator GL. After joining, the concentrated solution passes through the heating side of the low-temperature solution heat exchanger LX, and is then returned to the absorber A via the solution path 27.

The refrigerant vapor regenerated in the high-temperature regenerator GH and the flash vapor produced in the second drain heat exchanger DX2 are introduced into the heating side of the low-temperature regenerator GL through the refrigerant path 30 to heat and concentrate the dilute solution flowing downward from the sprayer, and then introduced into the condenser C through the refrigerant path 31.

The refrigerant vapor, which was regenerated in the low-temperature regenerator GL, is introduced into the condenser C via the eliminator. This refrigerant vapor is condensed by the cooling water flowing through the heat-transfer pipes of the condenser C to thereby become a refrigerant liquid. This refrigerant liquid joins the refrigerant condensed by the low-temperature regenerator GL, and is returned to the evaporator E through the refrigerant path 32.

Although the absorption refrigerating machine shown in FIG. 4 utilizes a cycle using a so-called branch flow, the present invention is not limited to this cycle.

FIG. 5 is a flow diagram showing the absorption refrigerating machine according to a fifth embodiment of the present invention. In this embodiment, the second drain heat exchanger DX2 is constructed integrally with the high-temperature regenerator GH. The solution, which was heated and concentrated in the second drain heat exchanger DX2, and the flash vapor flow into the high-temperature regenerator GH through an opening 165 formed in a side surface of the high-temperature regenerator GH. The flash vapor flows through the eliminator into the heating side of the low-temperature regenerator GL. The dilute solution, which has flowed into the high-temperature regenerator GH, is further heated and concentrated by the external heat source, whereby the refrigerant vapor is regenerated. Thereafter, the solution flows out of the high-temperature regenerator GH.

Providing the second drain heat exchanger DX2 integrally with the high-temperature regenerator GH can eliminate the need to provide a pipe for the flash vapor and can thus reduce radiation loss.

As shown in FIG. 5, the solution is divided at the branch point 122 positioned at a midpoint of the path of the heat-receiving side of the low-temperature solution heat exchanger LX, so that part of the dilute solution is led to the high-temperature regenerator GH via the first drain heat exchanger DX1 and the second drain heat exchanger DX2.

The low-temperature solution heat exchanger LX may be divided into two units so that the dilute solution is divided at a position between these two units. This structure can lower the temperature of the dilute solution to be supplied to the first drain heat exchanger DX1 to thereby facilitate heat recovery in the first drain heat exchanger DX1, and can also prevent insufficient cooling of the concentrated solution due to a lowered flow rate of the dilute solution in the low-temperature solution heat exchanger LX, i.e., can suppress a load increase in the absorber A.

FIG. 6 is a flow diagram showing the absorption refrigerating machine according to a sixth embodiment of the present invention. In this embodiment, the absorber and the evaporator have multistage structures. In FIG. 6, the absorber has a two-stage structure comprising the high-pressure absorber AH and the low-pressure absorber AL, and the evaporator also has a two-stage structure comprising the high-pressure evaporator EH and the low-pressure evaporator EL. It should be noted that the absorber and the evaporator are not limited to the two-stage structure.

The cold water with a relatively high temperature, which has been returned from the air conditioning operation, flows into the high-pressure evaporator EH, and is then cooled. Thereafter, the cold water is further cooled in the low-pressure evaporator EL, and is supplied to the air conditioner. In this structure, the high-pressure evaporator EH and the low-pressure evaporator EL operate at an evaporation temperature, e.g., 8° C. or 5° C. The high-pressure absorber AH and the low-pressure absorber AL, which operate together with these evaporators, can greatly lower the concentration of the dilute solution discharged from the absorber A. As a result, an amount of the circulating solution can be reduced, and the concentration difference between the dilute solution and the concentrated solution can be set to be large. Accordingly, the efficiency of the absorption refrigerating machine can be further improved. In this method, the temperature difference of the cold water can be set to, for example, about 8° C. which is higher than the normal temperature difference, i.e., 5° C., so that the concentration of the dilute solution discharged from the absorber can be further lowered.

Although FIG. 6 shows the flow direction such that the cooling water flows through the high-pressure absorber AH, the low-pressure absorber AL, and the condenser C in this order, the present invention is not limited to this direction. For example, the cooling water can flow through the high-pressure absorber AH and the low-pressure absorber AL in parallel, and the cooling water can flow from the condenser C to the absorber A. In this manner, the flow direction of the cooling water can be selected as desired.

Next, embodiments of the absorption refrigerating machine having the first and second high-temperature solution heat exchangers according to the present invention will be described.

FIG. 7 is a flow diagram showing the absorption refrigerating machine according to a seventh embodiment of the present invention. In FIG. 7, the dilute solution, which has absorbed the refrigerant vapor discharged from the evaporator E, is delivered by the solution pump SP to flow through the solution path 20 from the absorber A to the heat-receiving side of the low-temperature solution heat exchanger LX, where the dilute solution is heated. Then, the dilute solution flowing through the solution path 21 is divided at the branch point 22 on the solution path 21 into three currents flowing respectively into the first branch solution path 23A extending toward the high-temperature regenerator GH, the second branch solution path 23B extending toward the high-temperature regenerator GH, and the third branch solution path 23C extending toward the low-temperature regenerator GL.

The first high-temperature solution heat exchanger HX1 and the second high-temperature solution heat exchanger HX2 are provided on the first branch solution path 23A extending toward the high-temperature regenerator GH. The dilute solution to be supplied to the high-temperature regenerator GH through the first branch solution path 23A flows through the first high-temperature solution heat exchanger HX1 and the second high-temperature solution heat exchanger HX2 in this order, so that the dilute solution is successively heated. After being heated in this manner, the dilute solution is introduced into the high-temperature regenerator GH.

The first drain heat exchanger DX1 and the second drain heat exchanger DX2 are provided on the second branch solution path 23B extending toward the high-temperature regenerator GH. The dilute solution to be supplied to the high-temperature regenerator GH through second branch solution path 23B flows through the first drain heat exchanger DX1 and the second drain heat exchanger DX2 in this order, so that the dilute solution is successively heated. After being heated in this manner, the dilute solution is introduced into the high-temperature regenerator GH.

The external heat source, which is introduced through the heat source path 60, heats and concentrates the dilute solution in the high-temperature regenerator GH, and is then introduced into the second drain heat exchanger DX2 and the first drain heat exchanger DX1 in this order. The external heat source heats the dilute solution flowing through the heat-receiving sides of the second drain heat exchanger DX2 and the first drain heat exchanger DX1, and is then discharged through the heat source path 61.

The external heat source, which is introduced through the heat source path 60, heats and concentrates the concentrated solution in the high-temperature regenerator GH. The concentrated solution is led to the second drain heat exchanger DX2 and the first drain heat exchanger DX1 in this order to heat the dilute solution flowing through the heat-receiving sides of the second drain heat exchanger DX2 and the first drain heat exchanger DX1, and is then discharged through the heat source path 61. In this manner, heat is recovered from the internal cycle.

Generally, in the first high-temperature solution heat exchanger HX1 and the first drain heat exchanger DX1, the solution is not heated to a level so as to flash. However, in the second high-temperature solution heat exchanger HX2 and the second drain heat exchanger DX2, the solution may be heated to a level so as to flash. Flashing of the solution can greatly contribute to the improvement of efficiency. In such a case where the solution flashes in the second high-temperature solution heat exchanger HX2, it is preferable to provide the pipe 36 and/or the pipe 37 through which the flash vapor is discharged. Providing a pipe such as the pipe 37 is effective in removing the absorption solution accompanying the flash vapor, because the eliminator in the high-temperature regenerator GH can be utilized.

Similarly, in a case where the solution flashes in the second drain heat exchanger DX2, it is preferable to provide the pipe 136 and/or the pipe 137 through which the flash vapor is discharged. Providing a pipe such as the pipe 137 is effective in removing the absorption solution accompanying the flash vapor, because the eliminator in the high-temperature regenerator GH can be utilized.

Further, in order to sufficiently separate the flash vapor and the solution, it is preferable to introduce the concentrated solution into the heat-transfer member (of a tube type or plate-like type) which constitutes the second high-temperature solution heat exchanger HX2 or the second drain heat exchanger DX2, and to introduce the dilute solution to the outer portion of the heat-transfer member. Vapor, which has flashed in the second high-temperature solution heat exchanger HX2 or the second drain heat exchanger DX2, joins the vapor produced in the high-temperature regenerator GH, and is used in heating and concentrating the absorption solution in the low-temperature regenerator GL. In this manner, the flash vapor produced in the second high-temperature solution heat exchanger HX2 or the second drain heat exchanger DX2 functions with a double effect, and can thus greatly contribute to the improvement of efficiency.

The concentrated solution which was heated and concentrated in the high-temperature regenerator GH passes through the second high-temperature solution heat exchanger HX2 and the first high-temperature solution heat exchanger HX1, and then flows through the solution path 26 to join the concentrated solution returned from the low-temperature regenerator GL. After joining, the concentrated solution passes through the heating side of the low-temperature solution heat exchanger LX, and is returned to the absorber A via the solution path 27.

The refrigerant vapor regenerated in the high-temperature regenerator GH and the flash vapor produced in the second high-temperature solution heat exchanger HX2 are introduced into the heating side of the low-temperature regenerator GL through the refrigerant path 30 to heat and concentrate the dilute solution flowing downward from the sprayer, and then introduced into the condenser C through the refrigerant path 31.

The refrigerant vapor, which was regenerated in the low-temperature regenerator GL, is introduced into the condenser C via the eliminator. This refrigerant vapor is condensed by the cooling water flowing through the heat-transfer pipes of the condenser C to thereby become a refrigerant liquid. This refrigerant liquid joins the refrigerant condensed by the low-temperature regenerator GL, and is returned to the evaporator E through the refrigerant path 32.

Although the absorption refrigerating machine shown in FIG. 7 utilizes a cycle using a so-called branch flow, the present invention is not limited to this cycle.

FIG. 8 is a flow diagram showing the absorption refrigerating machine according to an eighth embodiment of the present invention. In this embodiment, the second high-temperature solution heat exchanger HX2 and the second drain heat exchanger DX2 are constructed integrally with the high-temperature regenerator GH.

The solution, which was heated and concentrated in the second high-temperature solution heat exchanger HX2 or the second drain heat exchanger DX2, and the flash vapor flow into the high-temperature regenerator GH through the openings 65 and 165 formed in the side surfaces of the high-temperature regenerator GH. The flash vapor flows through the eliminator into the heating side of the low-temperature regenerator GL. The dilute solution, which has flowed into the high-temperature regenerator GH, is further heated and concentrated by the external heat source, whereby the refrigerant vapor is regenerated. Thereafter, the solution flows out of the high-temperature regenerator GH.

Constructing the second high-temperature solution heat exchanger HX2 and the second drain heat exchanger DX2 integrally with the high-temperature regenerator GH can eliminate the need to provide a pipe for the flash vapor and can thus reduce radiation loss.

As shown in FIG. 8, the solution is divided at the branch point 122 positioned at a midpoint of the path of the heat-receiving side of the low-temperature solution heat exchanger LX, so that part of the dilute solution is led to the high-temperature regenerator GH via the first drain heat exchanger DX1 and the second drain heat exchanger DX2.

The low-temperature solution heat exchanger LX may be divided into two units so that the dilute solution is divided at a position between these two units. This structure can lower the temperature of the dilute solution to be supplied to the first drain heat exchanger DX1 to thereby facilitate heat recovery in the first drain heat exchanger DX1, and can also prevent insufficient cooling of the concentrated solution due to a lowered flow rate of the dilute solution in the low-temperature solution heat exchanger LX, i.e., can suppress a load increase in the absorber A.

FIG. 9 is a flow diagram showing the absorption refrigerating machine according to a ninth embodiment of the present invention. In this embodiment, the absorber and the evaporator have multistage structures. In FIG. 9, the absorber has a two-stage structure comprising the high-pressure absorber AH and the low-pressure absorber AL, and the evaporator also has a two-stage structure comprising the high-pressure evaporator EH and the low-pressure evaporator EL. It should be noted that the absorber and the evaporator are not limited to the two-stage structure.

The cold water with a relatively high temperature, which has been returned from the air conditioning operation, flows into the high-pressure evaporator EH, and is then cooled. Thereafter, the cold water is further cooled in the low-pressure evaporator EL, and is supplied to the air conditioner. In this structure, the high-pressure evaporator EH and the low-pressure evaporator EL operate at an evaporation temperature, e.g., 8° C. or 5° C. The high-pressure absorber AH and the low-pressure absorber AL, which operate together with these evaporators, can greatly lower the concentration of the dilute solution discharged from the absorber. As a result, an amount of the circulating solution can be reduced, and the concentration difference between the dilute solution and the concentrated solution can be set to be large. Accordingly, the efficiency of the absorption refrigerating machine can be further improved. In this method, the temperature difference of the cold water can be set to, for example, about 8° C. which is higher than the normal temperature difference, i.e., 5° C., so that the concentration of the dilute solution discharged from the absorber can be further lowered.

Although FIG. 9 shows the flow direction such that the cooling water flows through the high-pressure absorber AH, the low-pressure absorber AL, and the condenser C in this order, the present invention is not limited to this direction. For example, the cooling water can flow through the high-pressure absorber AH and the low-pressure absorber AL in parallel, and the cooling water can flow from the condenser C to the absorber. In this manner, the flow direction of the cooling water can be selected as desired.

Next, embodiments of the absorption refrigerating machine having the recovery heat exchanger which uses the low-temperature regenerator to recover heat according to the present invention will be described.

FIG. 10 is a flow diagram showing the absorption refrigerating machine according to a tenth embodiment of the present invention. In FIG. 10, the dilute solution, which has absorbed the refrigerant vapor discharged from the evaporator E, is delivered by the solution pump SP from the absorber A to the heat-receiving side of the low-temperature solution heat exchanger LX, where the dilute solution is heated. Then, the dilute solution flowing through the solution path 21 is divided at the branch point 22 on the solution path 21 into three currents flowing respectively into the first branch solution path 23A extending toward the high-temperature regenerator GH, the second branch solution path 23B extending toward the high-temperature regenerator GH, and the third branch solution path 23C extending toward the low-temperature regenerator GL.

The recovery heat exchanger GX is provided on the third branch solution path 23C. The recovery heat exchanger GX performs heat exchange between the concentrated solution discharged from the high-temperature regenerator GH and the dilute solution to be supplied to the low-temperature regenerator GL. Thereafter, the dilute solution is supplied to the sprayer of the low-temperature regenerator GL.

The refrigerant vapor which has flashed in the recovery heat exchanger GX flows through the refrigerant path 38 into the low-temperature regenerator GL. Whether flashing occurs in the recovery heat exchanger GX depends on the heat-transfer capability of the recovery heat exchanger GX.

The high-temperature solution heat exchanger HX is provided on the first branch solution path 23A extending toward the high-temperature regenerator GH. The dilute solution flows through the heat-receiving side of the high-temperature solution heat exchanger HX, and is heated by the concentrated solution discharged from the heating side of the recovery heat exchanger GX. Thereafter, the dilute solution flows into the high-temperature regenerator GH.

In this manner, part of the heat of the concentrated solution from the high-temperature regenerator GH is transferred to the dilute solution to be supplied to the low-temperature regenerator GL. Therefore, the temperature of the dilute solution can be prevented from excessively increasing in the high-temperature solution heat exchanger HX, and hence flashing can be prevented from occurring.

The drain heat exchanger DX is provided on the second branch solution path 23B extending toward the high-temperature regenerator GH. The external heat source, which is introduced through the heat source path 60, heats and concentrates the solution in the high-temperature regenerator GH. The external heat source is then introduced into the heating side of the drain heat exchanger DX to heat the dilute solution flowing through the heat-receiving side of the drain heat exchanger DX, and is then discharged through the heat source path 61.

The concentrated solution which was heated and concentrated in the high-temperature regenerator GH passes through the heating sides of the recovery heat exchanger GX and the high-temperature solution heat exchanger HX, and joins the concentrated solution returned from the low-temperature regenerator GL. Then, the concentrated solution passes through the heating side of the low-temperature solution heat exchanger LX, and is returned to the absorber A.

The refrigerant vapor regenerated in the high-temperature regenerator GH is introduced into the heating side of the low-temperature regenerator GL through the refrigerant path 30 to heat and concentrate the dilute solution flowing downward from the sprayer. Then, the refrigerant vapor is introduced into the condenser C through the refrigerant path 31.

The refrigerant vapor, which was regenerated in the low-temperature regenerator GL, is introduced into the condenser C via the eliminator. This refrigerant vapor is condensed by the cooling water flowing through the heat-transfer pipes of the condenser C to thereby become a refrigerant liquid. This refrigerant liquid joins the refrigerant condensed by the low-temperature regenerator GL, and is returned to the evaporator E through the refrigerant path 32.

Although the absorption refrigerating machine shown in FIG. 10 utilizes a cycle using a so-called branch flow, the present invention is not limited to this cycle.

FIG. 11 is a flow diagram showing the absorption refrigerating machine according to an eleventh embodiment of the present invention. In this embodiment, the recovery heat exchanger GX is disposed below the low-temperature regenerator GL, and is disposed in the same casing as the low-temperature regenerator GL. The dilute solution supplied to the low-temperature regenerator GL is sprayed by the sprayer toward the heat-transfer pipes of the low-temperature regenerator GL, so that the dilute solution is heated and concentrated by the high-temperature refrigerant vapor flowing through the heat-transfer pipes. Then, the dilute solution drips down onto the heat-transfer pipes of the recovery heat exchanger GX and is further heated and concentrated by the high-temperature concentrated solution flowing through the heat-transfer pipes. This arrangement can achieve a compact-sized structure, and can eliminate the need for providing the pipe for the flash vapor discharged from the recovery heat exchanger GX.

Although the recovery heat exchanger GX is disposed below the low-temperature regenerator GL in this example shown in FIG. 11, the present invention is not limited to this arrangement. For example, the recovery heat exchanger GX may be disposed above the low-temperature regenerator GL, or may be disposed laterally of the low-temperature regenerator GL. In a case where the recovery heat exchanger GX is disposed laterally of the low-temperature regenerator GL, sprayers may be provided separately for each, or a common sprayer may be provided.

As shown in FIG. 11, the solution is divided at the branch point 122 positioned at a midpoint of the path of the heat-receiving side of the low-temperature solution heat exchanger LX, so that part of the dilute solution is led to the high-temperature regenerator GH via the drain heat exchanger DX.

The low-temperature solution heat exchanger LX may be divided into two units so that the dilute solution is divided at a position between these two units. This structure can lower the temperature of the dilute solution to be supplied to the drain heat exchanger DX to thereby facilitate heat recovery in the drain heat exchanger DX, and can also prevent insufficient cooling of the concentrated solution due to a lowered flow rate of the dilute solution in the low-temperature solution heat exchanger LX, i.e., can suppress a load increase in the absorber A.

FIG. 12 is a flow diagram showing the absorption refrigerating machine according to a twelfth embodiment of the present invention. In this embodiment, the absorber and the evaporator have multistage structures. In FIG. 12, the absorber has a two-stage structure comprising the high-pressure absorber AH and the low-pressure absorber AL, and the evaporator also has a two-stage structure comprising the high-pressure evaporator EH and the low-pressure evaporator EL. It should be noted that the absorber and the evaporator are not limited to the two-stage structure.

The cold water with a relatively high temperature, which has been returned from the air conditioning operation, flows into the high-pressure evaporator EH, and is then cooled. Thereafter, the cold water is further cooled in the low-pressure evaporator EL, and is supplied to the air conditioner. In this structure, the high-pressure evaporator EH and the low-pressure evaporator EL operate at an evaporation temperature, e.g., 8° C. or 5° C. The high-pressure absorber AH and the low-pressure absorber AL, which operate together with these evaporators, can greatly lower the concentration of the dilute solution discharged from the absorber A. As a result, an amount of the circulating solution can be reduced, and the concentration difference between the dilute solution and the concentrated solution can be set to be large. Accordingly, the efficiency of the absorption refrigerating machine can be further improved. In this method, the temperature difference of the cold water can be set to, for example, about 8° C. which is higher than the normal temperature difference, i.e., 5° C., so that the concentration of the dilute solution discharged from the absorber can be further lowered.

Although FIG. 12 shows the flow direction such that the cooling water flows through the high-pressure absorber AH, the low-pressure absorber AL, and the condenser C in this order, the present invention is not limited to this direction. For example, the cooling water can flow through the high-pressure absorber AH and the low-pressure absorber AL in parallel, and the cooling water can flow from the condenser C to the absorber A. In this manner, the flow direction of the cooling water can be selected as desired.

The present invention having the above-mentioned structures can solve the drawbacks of the prior art. Specifically, the present invention can provide a high-efficiency absorption refrigerating machine which can efficiently recover heat of the external heat source and can efficiently recover internal heat.

Although certain preferred embodiments of the present invention have been described, it should be understood that the present invention is not limited to the above embodiments, and various changes and modifications may be made without departing from the scope of the technical concept of the present invention.

INDUSTRIAL APPLICABILITY

The present invention is applicable to a high-efficiency absorption refrigerating machine using vapor as a heat source for recovering heat from the heat source and for efficiently recovering heat from an internal cycle.

The invention claimed is:
1. An absorption refrigerating machine comprising:
   an evaporator;
   an absorber;
   a condenser;
   a high-temperature regenerator;
   a low-temperature regenerator;
   a low-temperature solution heat exchanger;
   a solution path through which an absorption solution flows;

a refrigerant path through which a refrigerant flows;

a first branch solution path and a second branch solution path configured to divide a dilute solution to be introduced from said absorber to said high-temperature regenerator;

a first high-temperature solution heat exchanger and a second high-temperature solution heat exchanger operable to perform heat exchange between the dilute solution in said first branch solution path and a concentrated solution heated and concentrated in said high-temperature regenerator; and a drain heat exchanger operable to perform heat exchange between the dilute solution in said second branch solution path and an exhaust heat source which has heated the dilute solution in said high-temperature regenerator, wherein the dilute solution in said first branch solution path flows through said first high-temperature solution heat exchanger and said second high-temperature solution heat exchanger in this order, and the concentrated solution discharged from said high-temperature regenerator flows through said second high-temperature solution heat exchanger and said first high-temperature solution heat exchanger in this order.

2. The absorption refrigerating machine according to claim 1, wherein the dilute solution to be supplied to said high-temperature regenerator flows along an outer portion of a heat-transfer member of said second high-temperature solution heat exchanger.

3. The absorption refrigerating machine according to claim 1, wherein said second high-temperature solution heat exchanger is constructed integrally with said high-temperature regenerator.

4. An absorption refrigerating machine comprising:
an evaporator;
an absorber;
a condenser;
a high-temperature regenerator;
a low-temperature regenerator;
a low-temperature solution heat exchanger;
a solution path through which an absorption solution flows;
a refrigerant path through which a refrigerant flows;
a first branch solution path and a second branch solution path configured to divide a dilute solution to be introduced from said absorber to said high-temperature regenerator;
a high-temperature solution heat exchanger operable to perform heat exchange between the dilute solution in said first branch solution path and a concentrated solution heated and concentrated in said high-temperature regenerator; and
a first drain heat exchanger and a second drain heat exchanger operable to perform heat exchange between the dilute solution in said second branch solution path and an exhaust heat source which has heated the dilute solution in said high-temperature regenerator,
wherein the dilute solution in said second branch solution path flows through said first drain heat exchanger and said second drain heat exchanger in this order, and
the exhaust heat source discharged from said high-temperature regenerator flows through said second drain heat exchanger and said first drain heat exchanger in this order.

5. The absorption refrigerating machine according to claim 4, wherein the dilute solution to be supplied to said high-temperature regenerator flows along an outer portion of a heat-transfer member of said second drain heat exchanger.

6. The absorption refrigerating machine according to claim 4, wherein said second drain heat exchanger is constructed integrally with said high-temperature regenerator.

7. An absorption refrigerating machine comprising:
an evaporator;
an absorber;
a condenser;
a high-temperature regenerator;
a low-temperature regenerator;
a low-temperature solution heat exchanger;
a solution path through which an absorption solution flows;
a refrigerant path through which a refrigerant flows;
a first branch solution path and a second branch solution path configured to divide a dilute solution to be introduced from said absorber to said high-temperature regenerator;
a first high-temperature solution heat exchanger and a second high-temperature solution heat exchanger operable to perform heat exchange between the dilute solution in said first branch solution path and a concentrated solution heated and concentrated in said high-temperature regenerator; and
a first drain heat exchanger and a second drain heat exchanger operable to perform heat exchange between the dilute solution in said second branch solution path and an exhaust heat source which has heated the dilute solution in said high-temperature regenerator,
wherein the dilute solution in said first branch solution path flows through said first high-temperature solution heat exchanger and said second high-temperature solution heat exchanger in this order,
the concentrated solution discharged from said high-temperature regenerator flows through said second high-temperature solution heat exchanger and said first high-temperature solution heat exchanger in this order,
the dilute solution in said second branch solution path flows through said first drain heat exchanger and said second drain heat exchanger in this order, and
the exhaust heat source discharged from said high-temperature regenerator flows through said second drain heat exchanger and said first drain heat exchanger in this order.

8. The absorption refrigerating machine according to claim 7, wherein the dilute solution to be supplied to said high-temperature regenerator flows along at least one of an outer portion of a heat-transfer member of said second high-temperature solution heat exchanger and an outer portion of a heat-transfer member of said second drain heat exchanger.

9. The absorption refrigerating machine according to claim 7, wherein at least one of said second high-temperature solution heat exchanger and said second drain heat exchanger is constructed integrally with said high-temperature regenerator.

10. An absorption refrigerating machine comprising:
an evaporator;
an absorber;
a condenser;
a high-temperature regenerator;
a low-temperature regenerator;
a low-temperature solution heat exchanger;
a solution path through which an absorption solution flows;
a refrigerant path through which a refrigerant flows;

a first branch solution path and a second branch solution path configured to divide a dilute solution to be introduced from said absorber to said high-temperature regenerator;

a recovery heat exchanger disposed on a solution path through which the dilute solution is introduced from said absorber to said low-temperature regenerator, said recovery heat exchanger being operable to perform heat exchange between the dilute solution in said solution path and a concentrated solution heated and concentrated in said high-temperature regenerator;

a high-temperature solution heat exchanger operable to perform heat exchange between the dilute solution in said first branch solution path and the concentrated solution heated and concentrated in said high-temperature regenerator; and a drain heat exchanger operable to perform heat exchange between the dilute solution in said second branch solution path and an exhaust heat source which has heated the dilute solution in said high-temperature regenerator.

11. The absorption refrigerating machine according to claim 10, wherein said recovery heat exchanger is disposed adjacent to a group of heat-transfer pipes of said low-temperature regenerator, and is disposed in a casing of said low-temperature regenerator.

12. The absorption refrigerating machine according to claim 1, wherein a solution path, through which the dilute solution is discharged from said absorber, extends through a heat-receiving side of said low-temperature solution heat exchanger to a branch point of said first branch solution path and said second branch solution path.

13. The absorption refrigerating machine according to claim 1, wherein a solution path, which extends to said high-temperature regenerator, branches into said first branch solution path and said second branch solution path at a midpoint of a heat-receiving side of said low-temperature solution heat exchanger.

14. The absorption refrigerating machine according to claim 1, wherein each of said evaporator and said absorber has a multistage structure which operates at different pressure stages.

* * * * *